United States Patent
Kakuguchi et al.

(10) Patent No.: US 7,149,558 B2
(45) Date of Patent: Dec. 12, 2006

(54) PORTABLE TERMINAL DEVICE

(75) Inventors: Kazuhiro Kakuguchi, Kawasaki (JP); Yoshiaki Kato, Kawasaki (JP); Atsuko Yamamoto, Kawasaki (JP); Toshiyuki Itoh, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 533 days.

(21) Appl. No.: 10/765,221

(22) Filed: Jan. 28, 2004

(65) Prior Publication Data

US 2004/0254001 A1 Dec. 16, 2004

(30) Foreign Application Priority Data

Mar. 28, 2003 (JP) ............... 2003-089553

(51) Int. Cl.
*H04M 1/00* (2006.01)
(52) U.S. Cl. ............... 455/575.8; 455/575.1; 379/428.01
(58) Field of Classification Search ............ 455/575.8, 455/575.1, 575.4, 90.3; 379/428.01, 440, 379/447, 453
See application file for complete search history.

(56) References Cited

U.S. PATENT DOCUMENTS 4,068,095 A * 1/1978 Ghormley et al. .......... 379/444
4,578,628 A * 3/1986 Siwiak .................. 320/127
2002/0136557 A1* 9/2002 Shimamura ............. 396/535

FOREIGN PATENT DOCUMENTS

| GB | 2 269 072 | 1/1994 |
|---|---|---|
| JP | 6-45986 | 2/1994 |
| JP | 6-268548 | 9/1994 |
| JP | 10-70375 | 3/1998 |
| JP | 2001-156896 | 6/2001 |

\* cited by examiner

*Primary Examiner*—Matthew D. Anderson
*Assistant Examiner*—Sanh Phu
(74) *Attorney, Agent, or Firm*—Westerman, Hattori, Daniels & Adrian, LLP.

(57) ABSTRACT

The present invention relates to a portable terminal device, such as a cellular phone, which has a screen display section, such as an LCD module, in its upper part and a key manipulation section having an array of plural keys in its lower part. The portable terminal device has a removable battery and is highly protected from water especially in a battery area. There is provided a pair of inner housings, that are a backside inner housing and a front side inner housing, which form a battery compartment having an opening for battery insertion/removal. A key manipulation sheet is disposed on the front side inner housing, and the whole components are covered with a pair of outer housings.

5 Claims, 9 Drawing Sheets

PORTABLE TERMINAL DEVICE

BACKGROUND OF THE INVENTION

1. Field of the Invention

The present invention relates to a portable terminal device, such as a cellular phone, which has a block-like screen display section, such as an LCD module, in its upper part and a sheet-like key manipulation section having an array of plural keys in its lower part.

2. Description of the Related Art

In recent years, portable terminal devices including cellular phones have become widely used. Some of these portable terminal devices have various additional capabilities, for example, are made waterproof.

In conventional waterproof portable terminal devices, a battery pack is located externally, and a cover is placed over the battery that is once mounted. Such a configuration requires a large-area and large-scale mechanism to hold the battery pack, protect it from water and hermetically seal in it, resulting in larger portable terminal devices.

Various techniques have been proposed to protect conventional portable terminal devices from water.

For example, in the patent reference 1, there is proposed an arrangement in which two housings surround an object and a packing is fitted into the gap between the housings engaged with each other.

In the patent reference 2, there is disclosed a case having an outer part made of a soft resin and an inner part made of a hard resin.

In these patent references, however, there is no description of a small-sized arrangement which has a removable battery pack and is highly waterproof.

Patent reference 1: Japanese Patent Laid-Open No. 10-70375

Patent reference 2: Japanese Patent Laid-Open No. 6-268548

SUMMARY OF THE INVENTION

In view of such circumstances, an object of the present invention is to provide a portable terminal device which has a removable battery and is highly protected from water especially in a battery housing compartment.

To attain the object described above, the present invention provides a portable terminal device having, in the upper part, a screen display section and, in the lower part, a key manipulation section having an array of a plurality of keys, including:

a first outer housing that covers the back side of contents including the screen display section and the key manipulation section;

a second outer housing that covers the front side of contents including the screen display section and the key manipulation section, the first and second outer housings having an outer opening formed at the bottom end thereof;

a first inner housing that is disposed in the space formed by the first and second outer housings and forms an inner wall of a battery compartment close to the first outer housing, a battery being slided into the battery compartment through the bottom end of the battery compartment;

a second inner housing that is disposed in the space formed by the first and second outer housings and forms an inner wall of the battery compartment close to the second outer housing, the first and second inner housings having an inner opening for battery insertion/removal formed at the bottom end thereof; and a third outer housing serving as a lid for closing the outer and inner openings in an openable manner, in which the key manipulation section is disposed on the second inner housing.

According to the present invention, a strongly-built battery compartment is provided in the portable terminal device, since the inner housings are disposed in the outer housings. The battery is slided into the battery compartment through the bottom end of the compartment. Thus, the passage connecting the battery compartment to the outside has the minimum possible cross-section and can be readily blocked. Thus, the waterproofing property is improved.

The key manipulation section is disposed on the second inner housing, and therefore, keys can be easily manipulated with the inner housing serving as a support.

Preferably, the portable terminal device according to the present invention further includes a circuit board disposed in the first outer housing, the screen display section is disposed on the circuit board at the upper part thereof, and the first inner housing covers the circuit board in cooperation with the first outer housing and surrounds the side faces of the screen display section.

With such a structure, the circuit board and the screen display section are covered with the housings, and thus, the waterproofing property is further improved.

Furthermore, in the portable terminal device according to the present invention, a joint between the housings is preferably filled with a filler, or the circuit board is preferably coated with a filler.

This can further improve the waterproofing property.

Furthermore, in the portable terminal device according to the present invention, a label may be affixed to or printed on a wall of the third outer housing which constitutes an inner wall of the battery compartment.

In conventional devices, the label is affixed to the wall of the space accommodating the battery. However, according to the present invention, the battery compartment is opened only at the bottom, so that the label cannot be affixed to or printed on the inside walls of the battery compartment. According to the present invention, there is provided the third outer housing serving as a lid for blocking the opening of the battery compartment, and thus, the label can be affixed to or printed on the inside wall of the third outer housing which constitutes an inside wall of the battery compartment.

As described above, according to the present invention, there is provided a portable terminal device which has a removable battery and is highly waterproof.

DETAILED DESCRIPTION OF THE PREFERRED EMBODIMENTS

Now, an embodiment of the present invention will be described. In the following, a cellular phone, which is an embodiment of a portable terminal device according to the present invention, will be described.

Figure 1:
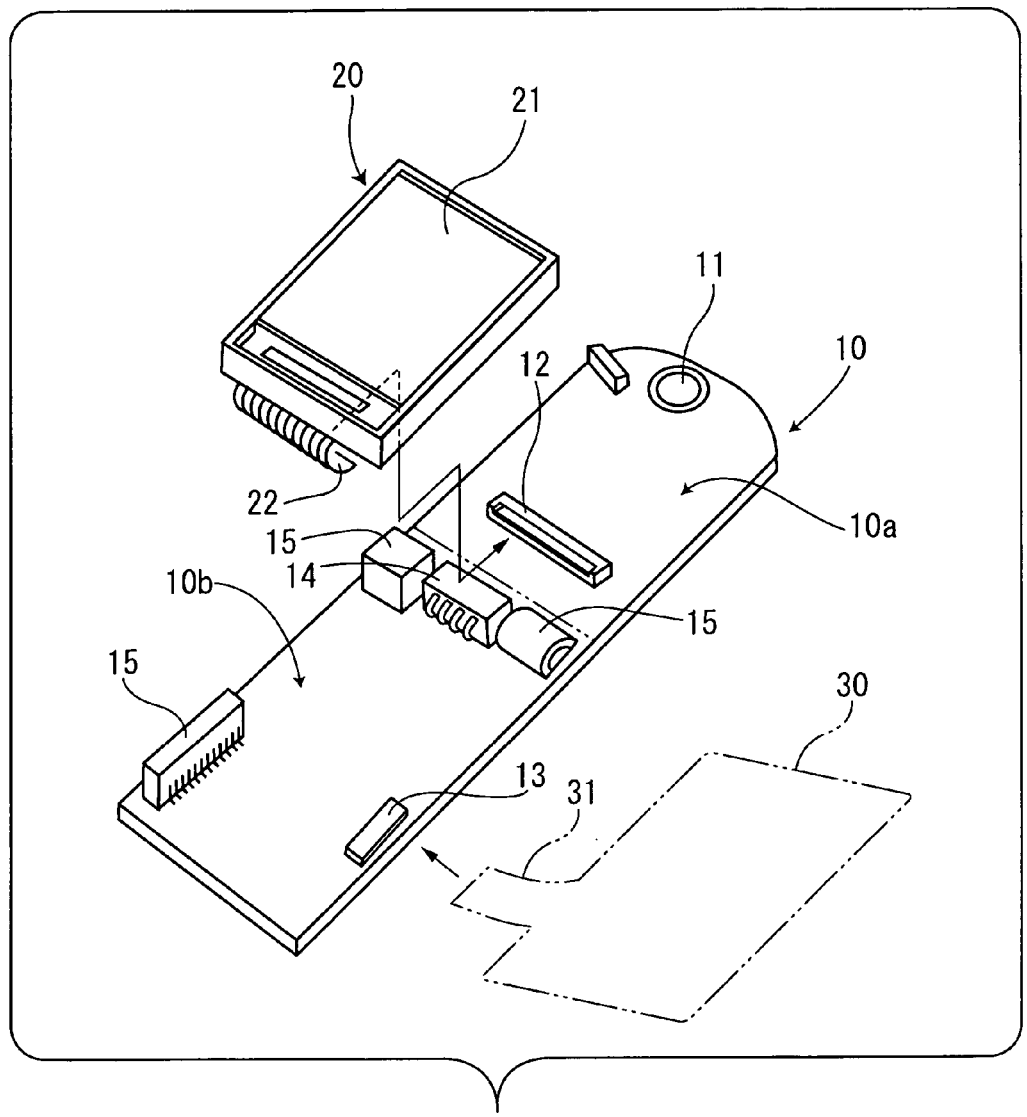
FIG. 1 is a perspective view of components of a cellular phone, which is an embodiment of the present invention.

FIG. 1 is a perspective view of components of the cellular phone, which is an embodiment of the present invention.

FIG. 1 shows a circuit board 10. The circuit board 10 has a small speaker 11 mounted at the uppermost part thereof and a connector 12 fixed thereto and located toward the upper end from the middle thereof. To the connector 12, a connector part 22, which is constituted by a flexible circuit board, of an image display module 20 having an LCD display screen (liquid crystal display screen) 21 is inserted. The image display module 20 is placed on the circuit board 10 at an upper section 10a.

In this drawing, the circuit board 10 has, in its lower section 10b, a connector 13 for a key manipulation section for entry of a telephone number or the like, a battery armature module 14 to be brought into contact with a battery (not shown) for receiving power, and some other circuit components 15. Although not shown in this drawing, at the middle area of the lower section 10b of the circuit board 10 which is surrounded by these circuit components, there are many other circuit components mounted.

Among these circuit components mounted at the lower section 10b of the circuit board 10, to the connector 13, a connector part 31 of a flexible substrate 30 for constituting the key manipulation section is inserted and, thus, the flexible substrate is supplied with electric power.

Figure 2:
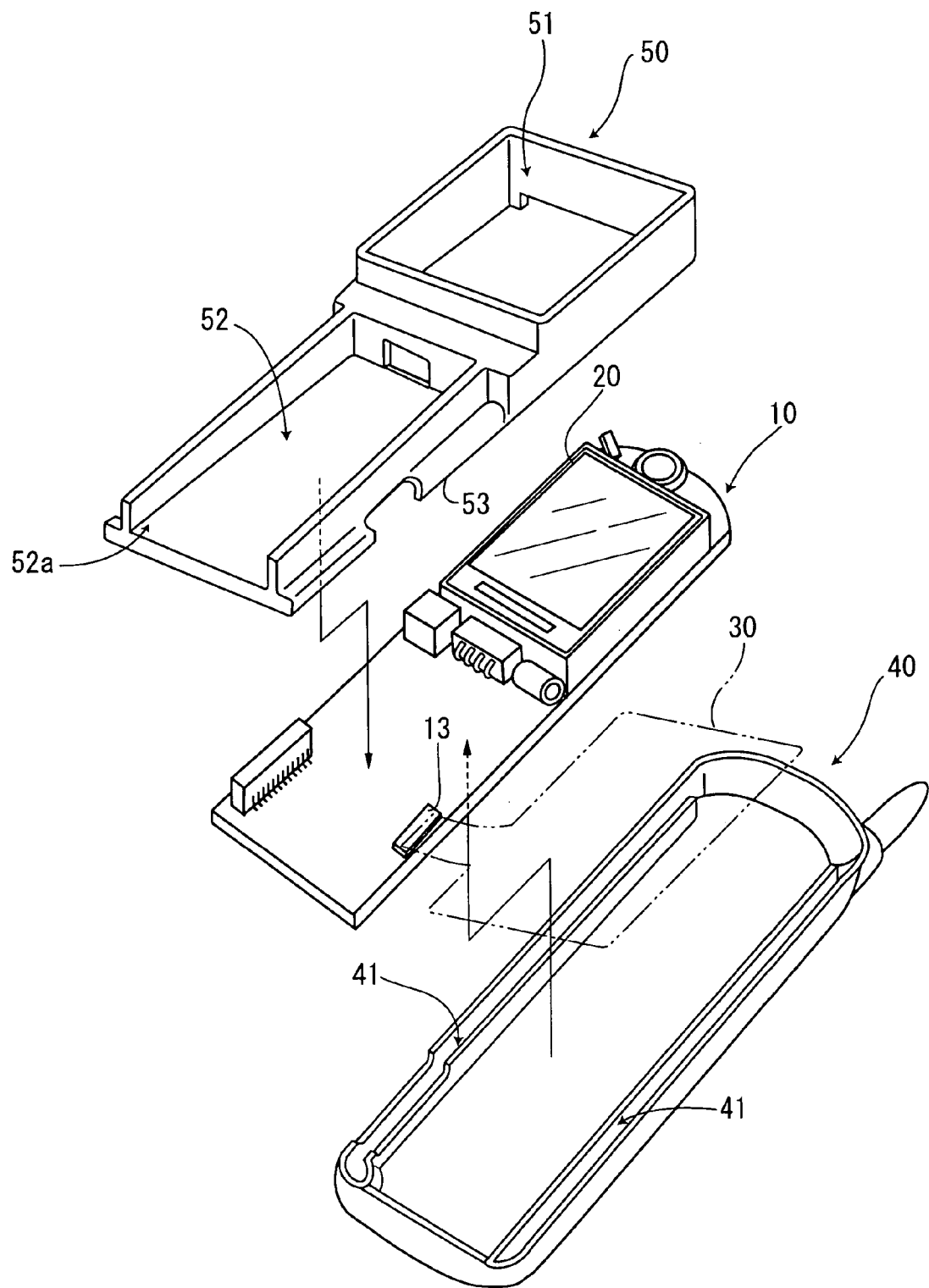
FIG. 2 is an exploded perspective view of the cellular phone in an assembly step following the step shown in FIG. 1.

FIG. 2 is an exploded perspective view of the cellular phone in an assembly step following the step shown in FIG. 1.

In this step, a backside outer housing 40 is fitted to the back surface of the circuit board 10 with the image display module 20 mounted thereon and the flexible substrate 30 plugged into the connector 13 as described above. A backside inner housing 50 is mounted on the front surface of the circuit board 10. The backside outer housing 40 has channels 41 extending longitudinally along the both sides.

The backside inner housing 50 has, in its upper section, an opening 51 piercing therethrough and surrounding the image display module 20 and, in its lower section, a recess section 52 to constitute a battery compartment. The recess section 52 has no wall at the bottom end 52a, providing an opening for battery insertion. The back surface of the backside inner housing 50 is recessed so that a space that accommodates the circuit board 10 is provided between the backside outer housing 40 and the backside inner housing 50 placed on the backside outer housing 40. In addition, the backside inner housing 50 has flanges 53 to be fitted into the channels 41 at the both sides of the backside outer housing 40.

Once the backside outer housing 40 is fitted to the back surface of the circuit board 10, and the backside inner housing 50 is mounted on the front surface of the circuit board 10, the circuit board 10 is sealed in between the inner surface of the backside outer housing 40 and the back surface of the backside inner housing 50, and the image display module 20 mounted on the circuit board 10 is surrounded by the walls constituting the opening 51 at the upper section of the backside inner housing 50.

Figure 3:
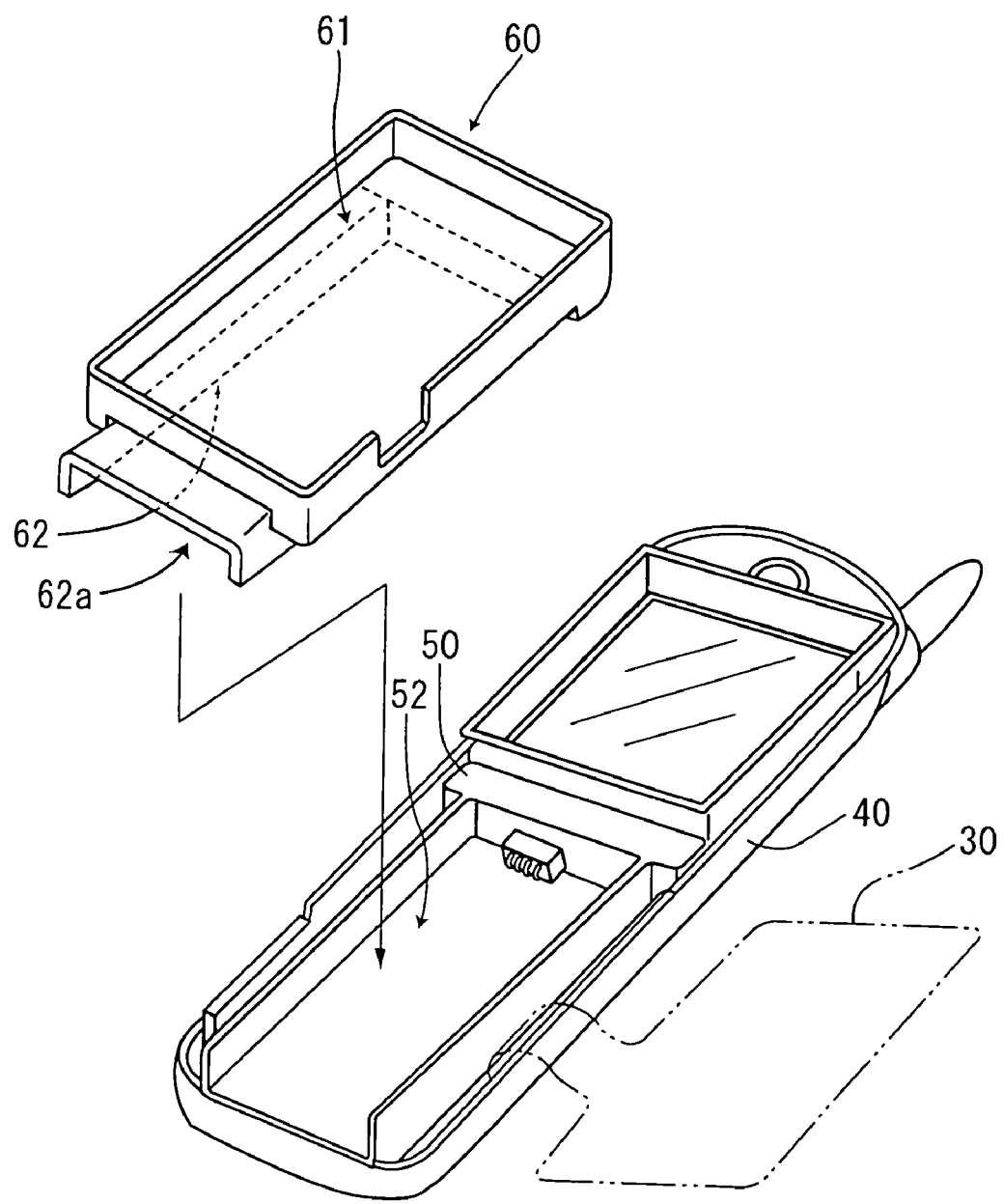
FIG. 3 is an exploded perspective view showing an assembly step following the step shown in FIG. 2.

FIG. 3 is an exploded perspective view showing an assembly step following the step shown in FIG. 2.

After the circuit board 10 (see FIG. 2) is sandwiched between the backside outer housing 40 and the backside inner housing 50 as described with reference to FIG. 2, a frontside inner housing 60 is placed over the lower section of the backside inner housing 50 where the recess section 52 to constitute the battery compartment is formed. The frontside inner housing 60 has, on its front side, a recess section 61 in which the key manipulation section (not shown in this drawing) is to be placed and, on its back side, a recess section 62 which cooperates with the recess section 52 of the backside inner housing 50 to define the battery compartment. The recess section 62 forming the battery compartment has no wall at the bottom end 62a, and the bottom end 62a and the bottom end 52a of the backside inner housing 50 cooperatively provide the opening for inserting/removing a battery to/from the battery compartment.

Figure 4:
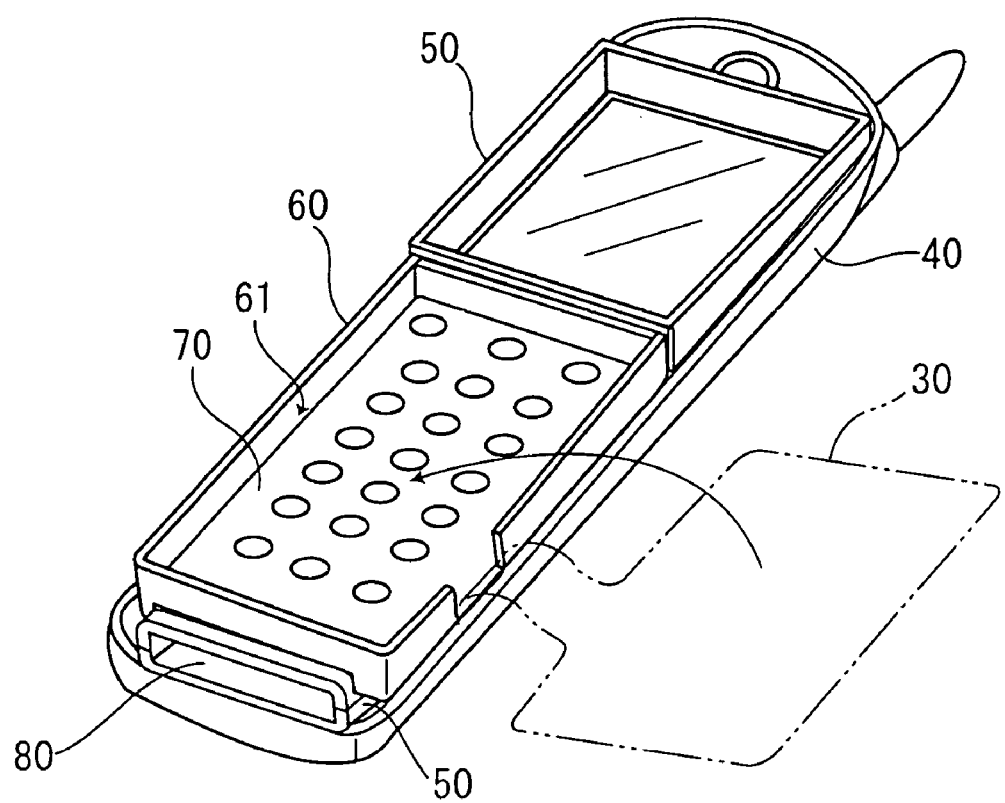
FIG. 4 is an exploded perspective view showing an assembly step following the step shown in FIG. 3.

FIG. 4 is an exploded perspective view showing an assembly step following the step shown in FIG. 3.

After the frontside inner housing 60 is placed over the backside inner housing 50 as shown in FIG. 3, the flexible substrate 30 for constituting the key manipulation section is mounted in the recess section 61 on the front of the front side inner housing 60. Then, a key manipulation sheet 70, which also constitutes the key manipulation section and is to turn on/off contacts on the flexible substrate 30, is mounted on the flexible substrate 30.

In FIG. 4, there is shown an opening 80 at the bottom end for inserting/removing a battery into/from the battery compartment, which is formed by the backside inner housing 50 and the frontside inner housing 60.

Figure 5:
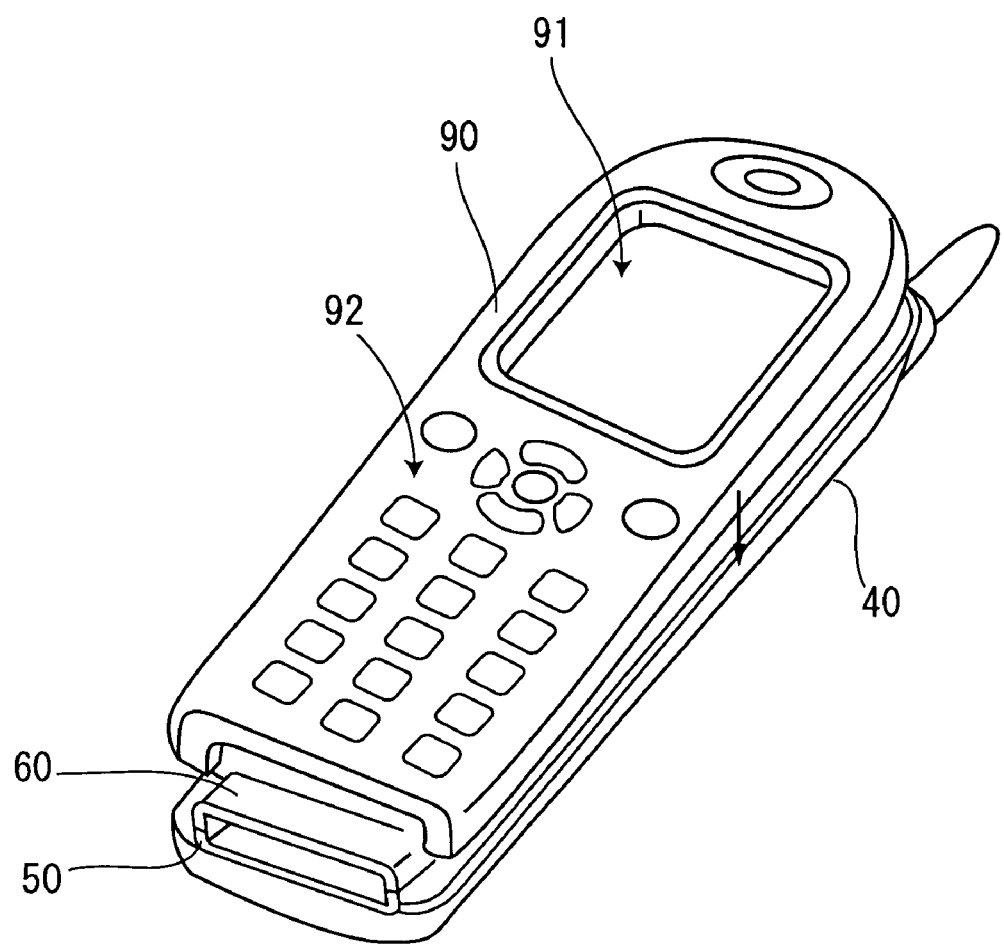
FIG. 5 is an exploded perspective view showing an assembly step following the step shown in FIG. 4.

FIG. 5 is an exploded perspective view showing an assembly step following the step shown in FIG. 4.

After the key manipulation section consisting of the flexible substrate 30 and the key manipulation sheet 70 is placed on the frontside inner housing 60, as shown in FIG. 4, a frontside outer housing 90 is placed thereon. The frontside outer housing 90 has a display window 91, which is fitted with a transparent plastic plate, in its upper section of the frontside outer housing 90 over the image display module 20 (see FIGS. 1 to 4) and an array of manipulation elements in its lower section over the key manipulation section (see FIG. 4) consisting of the flexible substrate 30 and the key manipulation sheet 70, each of the manipulation elements exerting a pressure on the key manipulation sheet 70 when it is pressed, thereby causing a contact on the flexible substrate 30 to conduct electricity.

Figure 6:
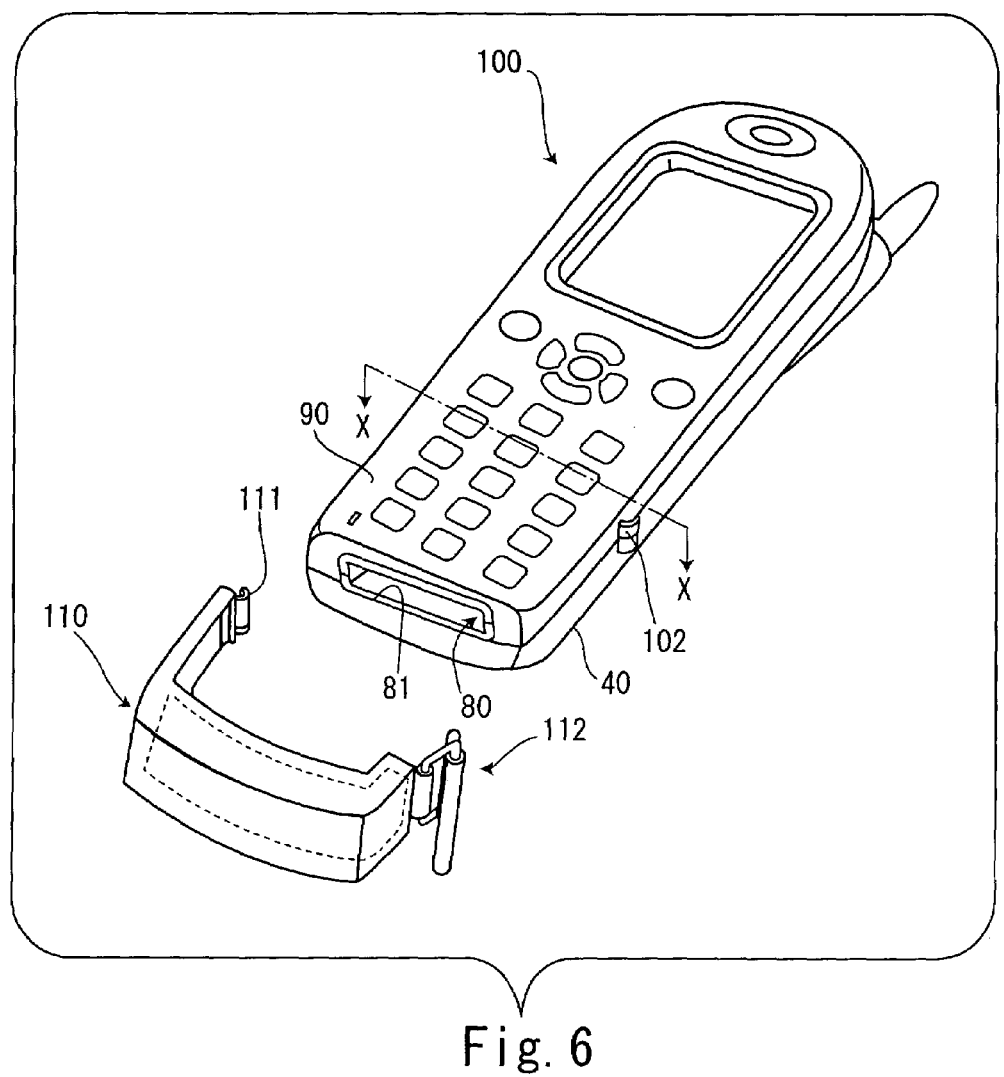
FIG. 6 is an exploded perspective view showing an assembly step following the step shown in FIG. 5.

FIG. 6 is an exploded perspective view showing an assembly step following the step shown in FIG. 5.

FIG. 6 shows a main unit 100 assembled in the steps shown in FIGS. 1 to 5 and a lid 110. The main unit 100 has, at the bottom end thereof, the opening 80 for battery insertion/removal which is defined by the backside inner housing 50 and the frontside inner housing 60 and an opening 81 surrounding the opening 80 which is defined by the backside outer housing 40 and the frontside outer housing 90. The opening 80 for battery insertion/removal defined by the backside inner housing 50 and the frontside inner housing 60 is accommodated in the opening 81 defined by the backside outer housing 40 and the frontside outer housing 90.

The lid 110 is to block the opening 80 for battery insertion/removal formed in the main unit 100 in an openable manner. The lid 110 has a hook 111 at one end thereof and a mounting hardware member 112 at the other end thereof.

Although any retainer for retaining the lid 110 is not shown in FIGS. 1 to 5 described so far, FIG. 6 shows a retainer 102 for retaining the mounting hardware member 112 of the lid 110.

Figure 7:
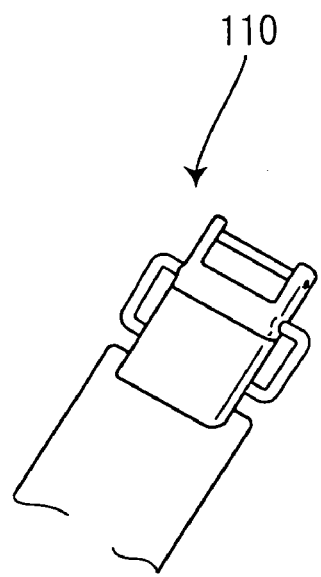
FIG. 7 shows a mounting hardware member of a lid viewed from a direction different from that in FIG. 6.
Figure 8:
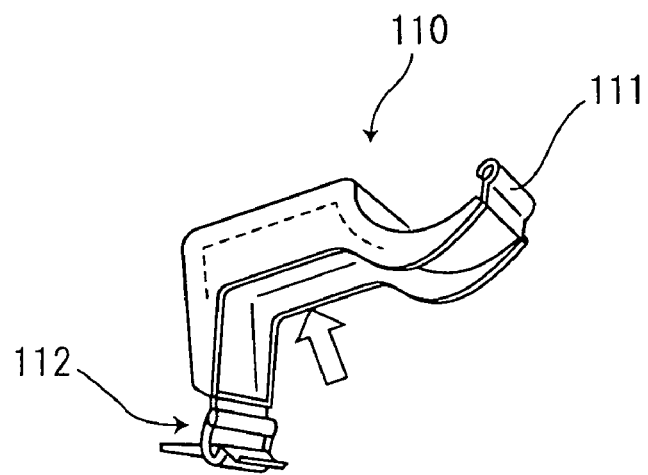
FIG. 8 shows the lid viewed from another direction.

FIG. 7 shows the mounting hardware member of the lid viewed from a direction different from that in FIG. 6, and FIG. 8 shows the lid viewed from another direction. For convenience of mounting or removing the lid 110 on or from the bottom end of the main unit 100, a part of the lid 110 close to the hook 111 is flexible so that it is bent as shown in FIG. 8 when a force is applied thereto.

Figure 9:
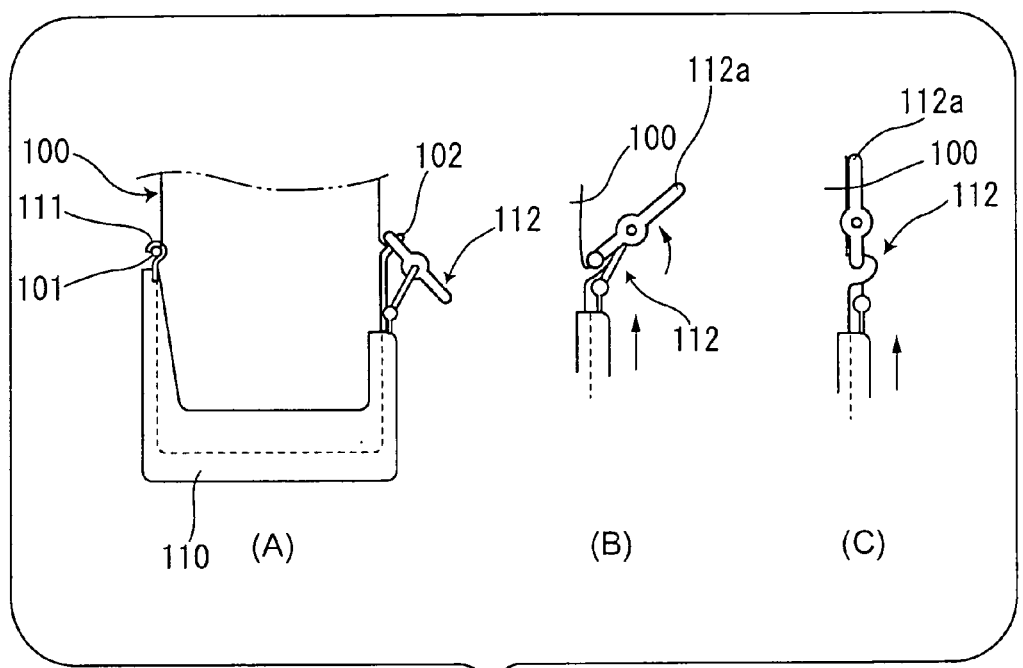
FIG. 9 illustrates a process of attaching the lid to a main unit.

FIG. 9 illustrates a process of attaching the lid 110 to the main unit 100.

The main unit 100 has a retainer 101 for retaining the hook 111 of the lid 110 on one side surface thereof and the retainer 102 for retaining the mounting hardware member 112 of the lid 110 on the other side surface thereof.

When attaching the lid 110 to the bottom end of the main unit 100, the hook 111 of the lid 110 is engaged with the retainer 101 of the main unit 100 so that the lid 110 covers the bottom end of the main unit 100, and the mounting hardware member 112 of the lid 110 is engaged with the retainer 102 of the main unit 100, as shown in Part (A) of FIG. 9. Then, as shown in Parts (B) and (C) of FIG. 9, a lever 112a of the mounting hardware member 112 is rotated to a position where it comes into contact with the main unit 100.

On the other hand, when removing the lid 110 from the main unit 100, the lever 112a of the mounting hardware member 112 which is in the position shown in Part (C) of FIG. 9 is rotated to the position shown in Part (B) of FIG. 9, and then, to the position shown in Part (A) of FIG. 9. Thus, the mounting hardware member 112 is detached from the retainer 102. Once the mounting hardware member 112 is detached from the retainer 102, the opening 80 (see FIG. 6) can be uncovered and the battery can be inserted to or removed from the battery compartment without detaching the hook 111 of the lid 100 from the retainer 101, due to the flexibility of the lid as shown in FIG. 8. If the hook 111 of the lid 110 is detached from the retainer 101 of the main unit 100, the lid is separated from the main unit 100.

Figures 10, 11:
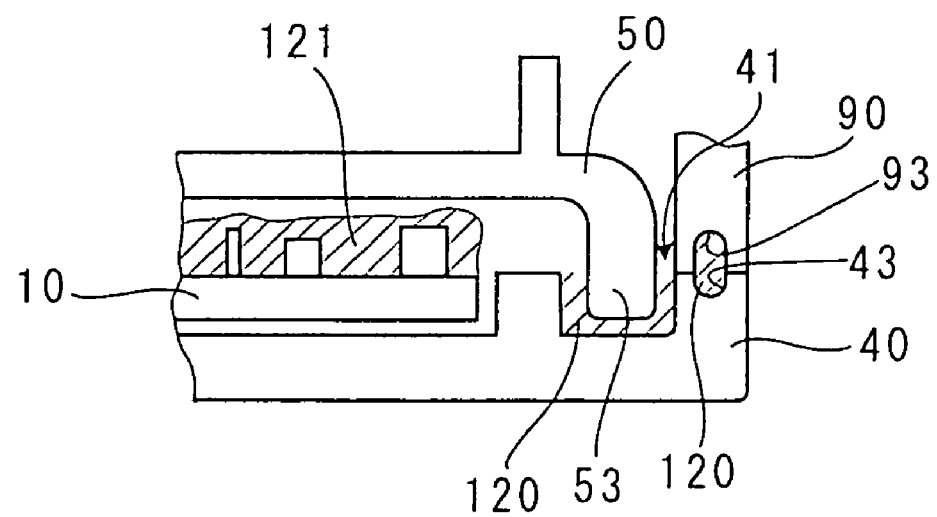
FIG. 10 shows a label affixed to an inner wall of the lid which constitutes an inner wall of a battery compartment.
FIG. 11 is a partial enlarged cross-sectional view of the cellular phone taken along the arrow X—X in FIG. 6.

FIG. 10 shows a label affixed to the inner wall of the lid 110 which constitutes an inner wall of the battery compartment.

This label can be seen when the lid 110 is viewed from the direction indicated by the arrow in FIG. 8.

In the case of this cellular phone, only the opening 80 (see FIG. 6) of the battery compartment can be seen externally only when the lid 110 is removed. Thus, unlike conventional cellular phones, the label cannot be affixed to the battery mount in the battery compartment. Therefore, the label describing the specifications, the model number or the like is affixed to the inner wall of the lid 110. This also holds true for the case of directly printing the specifications, the model number or the like instead of using such a label.

FIG. 11 is a partial enlarged cross-sectional view of the cellular phone taken along the arrow X—X in FIG. 6.

The flange 53 of the backside inner housing 50 is fitted into the channel 41 (see FIG. 2) of the backside outer housing 40, and the circuit board 10 with the circuit component mounted thereon is disposed between the backside outer housing 40 and the backside inner housing 50. On the backside outer housing 40, the frontside outer housing 90 is disposed with their outer surfaces seamlessly connected.

In the surface of the outermost edge of the backside outer housing 40 which is brought into contact with the edge of the frontside outer housing 90, a groove 43 extending in the direction perpendicular to the sheet of FIG. 11 is formed. Similarly, in the surface of the outermost edge of the frontside outer housing 90 which is brought into contact with the edge of the backside outer housing 40, a groove 93 extending in the direction perpendicular to the sheet of FIG. 11 is formed. The grooves 43 and 93 are filled with a waterproof filler 120 when assembling the cellular phone. Similarly, the channel 41 (see FIG. 2) of the backside outer housing 40, into which the flange 53 of the backside inner housing 50 is fitted, is filled with the waterproof filler 120 when assembling the cellular phone.

In addition, the circuit components on the circuit board 10 are coated with a waterproof filler 121 of a foam material, which is expandable in consideration of weight reduction.

Since the joint between the housings and the space over the circuit board are filled with the fillers in this way, the waterproofing property is significantly improved.

Although the cellular phone has been described herein as an example of the portable terminal device according to the present invention, the portable terminal device according to the present invention is not exclusively the cellular phone. The present invention may be applied to PHS (Personal Handyphone System), PDA (Personal Digital Assistants) or the like.

What is claimed is:

1. A portable terminal device having, in the upper part, a screen display section and, in the lower part, a key manipulation section having an array of a plurality of keys, comprising:
   a first outer housing that covers the back side of contents including the screen display section and the key manipulation section;
   a second outer housing that covers the front side of the contents including the screen display section and the key manipulation section, the first and second outer housings having an outer opening formed at the bottom end thereof;
   a first inner housing that is disposed in the inner space formed by the first and second outer housings and forms an inner wall of a battery compartment close to the first outer housing, a battery being slided into the battery compartment through the bottom end of the battery compartment;
   a second inner housing that is disposed in the inner space formed by the first and second outer housings and forms an inner wall of the battery compartment close to the second outer housing, the first and second inner housings having an inner opening for battery insertion/removal formed at the bottom end thereof; and
   a third outer housing serving as a lid for closing the outer and inner openings in an openable manner,
   wherein the key manipulation section is disposed on the second inner housing.

2. The portable terminal device according to claim 1, further comprising a circuit board disposed in the first outer housing, the screen display section being disposed on the circuit board at the upper part thereof,
   wherein the first inner housing covers the circuit board in cooperation with the first outer housing and surrounds the side faces of the screen display section.

3. The portable terminal device according to claim 1, wherein a joint between the housings is filled with a filler.

4. The portable terminal device according to claim 1, wherein the circuit board is coated with a filler.

5. The portable terminal device according to claim 1, wherein a label is affixed to or printed on a wall of the third outer housing which constitutes an inner wall of the battery compartment.

* * * * *